United States Patent
Shimakura

(10) Patent No.: US 7,149,039 B2
(45) Date of Patent: Dec. 12, 2006

(54) LENS BARREL

(75) Inventor: Takahiro Shimakura, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/121,045

(22) Filed: May 4, 2005

(65) Prior Publication Data

US 2005/0254146 A1  Nov. 17, 2005

(30) Foreign Application Priority Data

May 17, 2004  (JP) ............................. P.2004-146725

(51) Int. Cl.
G02B 15/14 (2006.01)

(52) U.S. Cl. .................. 359/704; 359/703; 359/683; 359/819

(58) Field of Classification Search ................ 359/704, 359/703, 683, 694, 811, 813, 819, 821, 822, 359/823, 826, 827
See application file for complete search history.

(56) References Cited

U.S. PATENT DOCUMENTS 6,452,732 B1 * 9/2002 Okada et al. ............... 359/813
6,796,682 B1 * 9/2004 Hough et al. ............... 362/268
6,909,558 B1 * 6/2005 Orimo et al. ............... 359/694
2003/0103157 A1 * 6/2003 Watanabe et al. ........... 348/360
2005/0018423 A1 * 1/2005 Warnecke et al. .......... 362/230

FOREIGN PATENT DOCUMENTS

| EP | 1207687 | 5/2002 |
|---|---|---|
| JP | 11125852 | 5/1999 |
| JP | 2002-189238 A | 7/2002 |
| JP | 2002-350701 | 12/2002 |

OTHER PUBLICATIONS

European Search Report dated Mar. 27, 2006.

* cited by examiner

Primary Examiner—Timothy Thompson
(74) Attorney, Agent, or Firm—Harness, Dickey & Pierce

(57) ABSTRACT

To provide a lens barrel having an optical filter at a low cost, a lens barrel is provided and has: an aperture between two lenses held in the lens barrel; and at least one optical filter disposed to rearward of one of the two lenses, wherein the one of the two lenses is situated closer to the camera body than the other of the two lenses, and the at least one optical filter blocks or passes light depending on a wavelength of the light.

10 Claims, 3 Drawing Sheets

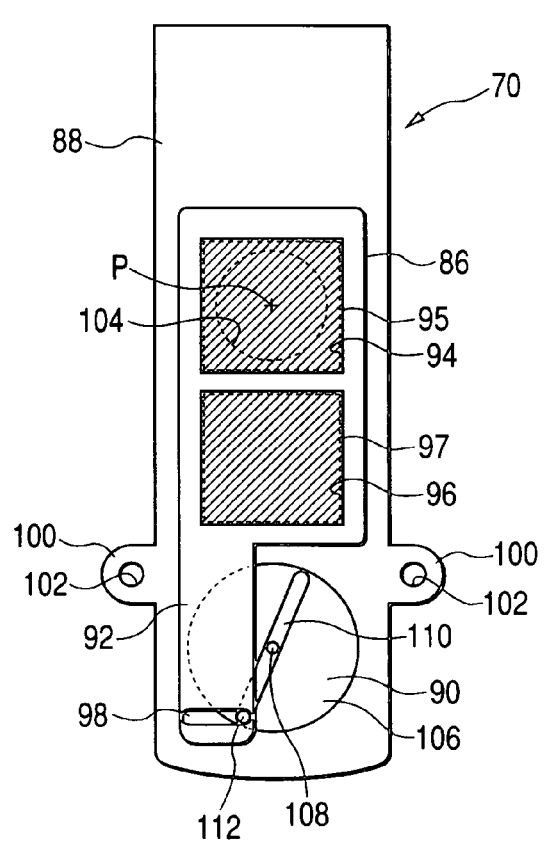
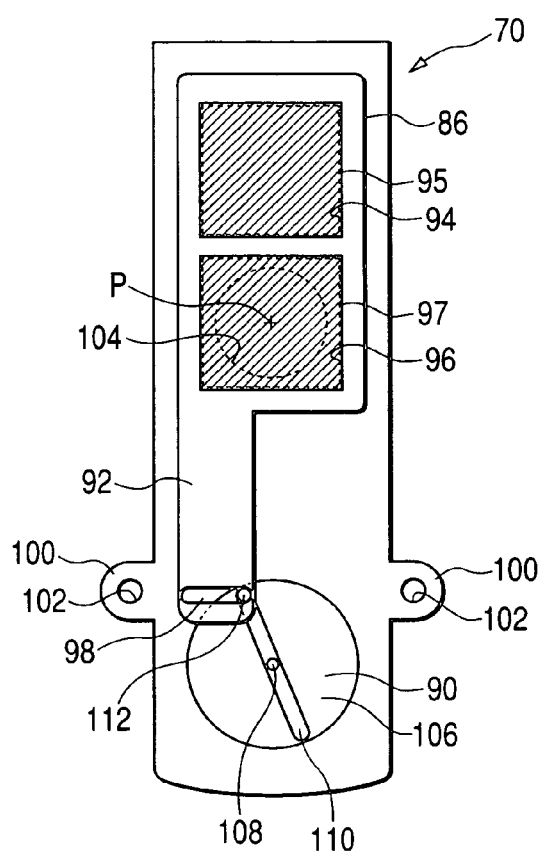

LENS BARREL

FIELD OF THE INVENTION

This invention relates to a lens barrel and more particularly to a lens barrel used in a monitoring camera, etc.

BACKGROUND OF THE INVENTION

One kind of monitoring camera adapted for use in both of the visible region (in the daytime) and the near-infrared region (at night) is of the type in which an infrared cutoff filter for cutting off near-infrared light is positioned on the optical axis in front of an imaging device (CCD) when the camera is used to take images in the visible region, while a dummy filter replaces the infrared cutoff filter when the camera is used to take images in the near-infrared region, so that it may be possible to correct any deviation of image focus location occurring under the influence of axial chromatic aberration.

The mechanism for an infrared cutoff filter as stated above (hereinafter referred to as the infrared cutoff filter mechanism) has hitherto been installed in a camera body with an imaging device. In a recently sold monitoring camera having a lens barrel forming an integral part of the camera body, however, the installation of the infrared cutoff filter mechanism in the camera body has been made difficult by a reduction in size of the camera body, etc.

Accordingly, there has been proposed a technique for installing an infrared cutoff filter mechanism in a lens barrel (see, for example, JP-A-2002-189238). According to the literature, an infrared cutoff filter mechanism is integrally connected to an aperture mechanism and installed in a lens barrel.

FIG. 3 is a schematic illustration of a monitoring camera equipped with a lens barrel having an aperture mechanism connected integrally to an infrared cutoff filter mechanism. As shown in FIG. 3, the monitoring camera 200 includes a camera body 202 and a lens barrel 204. The lens barrel 204 includes a front fixing cylinder 206 for fixing a first lens (group) 212, a rear fixing cylinder 208 for fixing a second lens (group) 214 and a CCD fixing cylinder 210 for fixing a CCD 216. An aperture mechanism 218 connected integrally to an infrared cutoff filter mechanism is positioned between the front and rear fixing cylinders 206 and 208.

In the aperture mechanism 218, an aperture 220 formed by two aperture blades and a filter fixing plate 222 for fixing an optical filter, such as an infrared cutoff filter, are disposed along the front and rear surfaces, respectively, of a base plate 224. The aperture mechanism 218 also includes on the outer periphery of the lens barrel 204 an aperture driving device 226 for adjusting the size of a clear aperture in the aperture 220 and a filter driving device 228 for installing and uninstalling the optical filter on the optical axis.

However, the presence of the aperture mechanism connected integrally to the infrared cutoff filter mechanism between the first and second lenses 212 and 214 as shown in FIG. 3 makes it necessary to design an especially wide spacing between the lenses as compared with any ordinary lens barrel. Moreover, the provision of the aperture driving device 226 and the filter driving device 228 on the outer periphery of the lens barrel 204 makes it necessary to design new component parts, etc. on the outer periphery of the lens barrel 204. Accordingly, they fail to be common with many component parts on any ordinary lens barrel, but objectionably add to the cost of manufacturing the lens barrel.

The integral connection of the aperture and infrared cutoff filter mechanisms makes it necessary to disassemble them as a whole in the event of failure of any component part of either of them to examine the cause of its failure and repair it.

SUMMARY OF THE INVENTION

Under these circumstances, an object of an illustrative, non-limiting embodiment of the invention is to provide a lens barrel having an optical filter, such as an infrared cutoff filter, at a low cost. Also, the invention is not required to overcome the disadvantage described above (i.e., high cost of the manufacturing or so), and an illustrative, non-limiting embodiment of the invention may overcome a different disadvantage or may not overcome any disadvantages.

(1) A lens barrel of the invention is a lens barrel capable of being mounted to a camera body, which includes an aperture between two lenses held in the lens barrel and at least one optical filter disposed to rearward of one of the two lenses, wherein the one of the two lenses is situated closer to the camera body than the other of the two lenses, and the at least one optical filter blocks or transmits (or passes) light depending on a wavelength of the light.

According to the invention, the optical filter is installed independently of the aperture between the lenses, and the optical filter is installed to rearward of the lens situated closer to the cameral body. Therefore, the installation of the optical filter in the lens barrel does not require any change in design between the lenses, but makes it possible to use many parts common to any ordinary lens barrel and thereby manufacture the lens barrel at a low cost.

As the optical filter is installed separately from the aperture, they are easy to maintain, since in the event of failure of any component part of one of the mechanisms including them, it is sufficient to disassemble the mechanism in question, examine the cause of the failure and repair the mechanism.

(2) A lens barrel of the invention is a lens barrel as set forth in (1) above, further including a filter switching unit for installing the at least one optical filter on an optical axis of the lens barrel and for uninstalling the at least one optical filter from the optical axis.

The aspect of (2) above makes it possible to install or uninstall the optical filter easily, depending on the situation of taking images, as well as exhibiting the effects of the aspect of (1) above.

(3) A lens barrel of the invention is a lens barrel as set forth in (1) or (2) above, wherein the at least one optical filter blocks light in a near-infrared region.

The aspect of above (3) makes it possible to intercept light in the near-infrared region when taking images in the visible region, as well as exhibiting the effects of the aspect of (1) or (2) above.

(4) A lens barrel of the invention is a lens barrel as set forth in (1) or (2) above, wherein the optical filter comprises a first optical filter blocking light in a near-infrared region and a second optical filter transmitting light in the near-infrared region.

The aspect of (4) above makes it possible to correct any deviation of image focus location occurring under the influence of axial chromatic aberration when taking images in both of the visible and near-infrared regions of wavelengths, as well as exhibiting the effects of the aspect of (1) or (2) above.

(5) A lens barrel of the invention is a lens barrel as set forth in any of (1) to (4) above, further including a first fixing cylinder holding the two lenses and a second fixing cylinder situated to rearward of the first fixing cylinder, the second fixing cylinder holding an imaging device, wherein the at least one optical filter is disposed (or installed) in the second fixing cylinder.

The aspect of (5) above makes it possible to eliminate the necessity for any change in design of the first fixing cylinder and thereby use many parts common to any ordinary lens barrel and manufacture the lens barrel at a low cost.

An embodiment of the lens barrel according to the invention eliminates the necessity for any change in design between the lenses, since the optical filter is situated separately from the aperture between the lenses and rearwardly of the lens closer to the camera body.

Therefore, it shares many parts with any ordinary lens barrel and can be manufactured at a low cost.

BRIEF DESCRIPTION OF THE DRAWINGS

FIGS. 2A and 2B each are a front elevational view of the filter mechanism in the lens barrel shown in FIG. 1.

DETAILED DESCRIPTION OF THE INVENTION

An exemplary embodiment of the lens barrel of the invention will now be described with reference to drawings.

Figure 1:
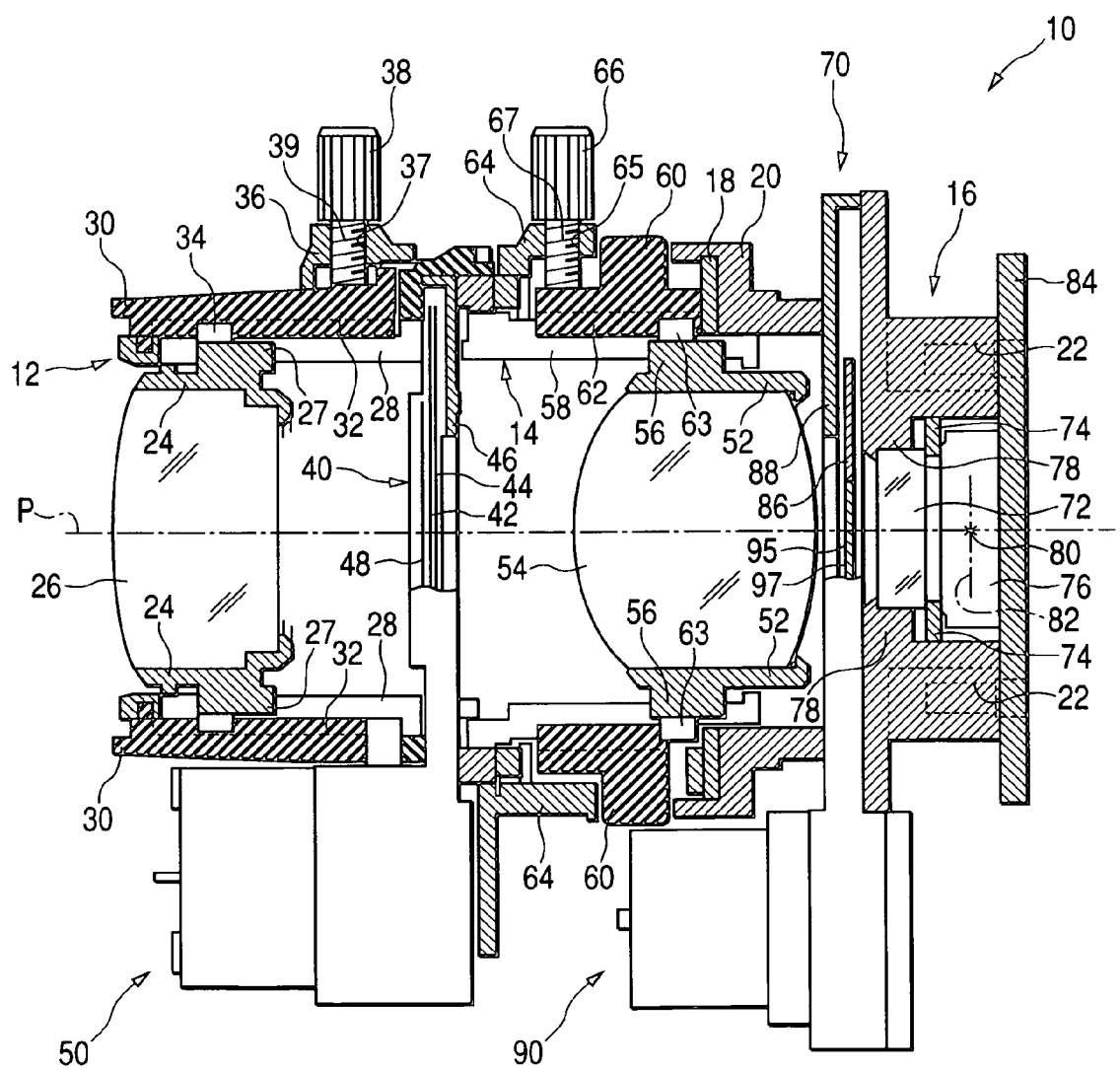
FIG. 1 shows a side elevational view, partly in section, of a lens barrel according to an illustrative, non-limiting embodiment of the invention.
Figure 3:
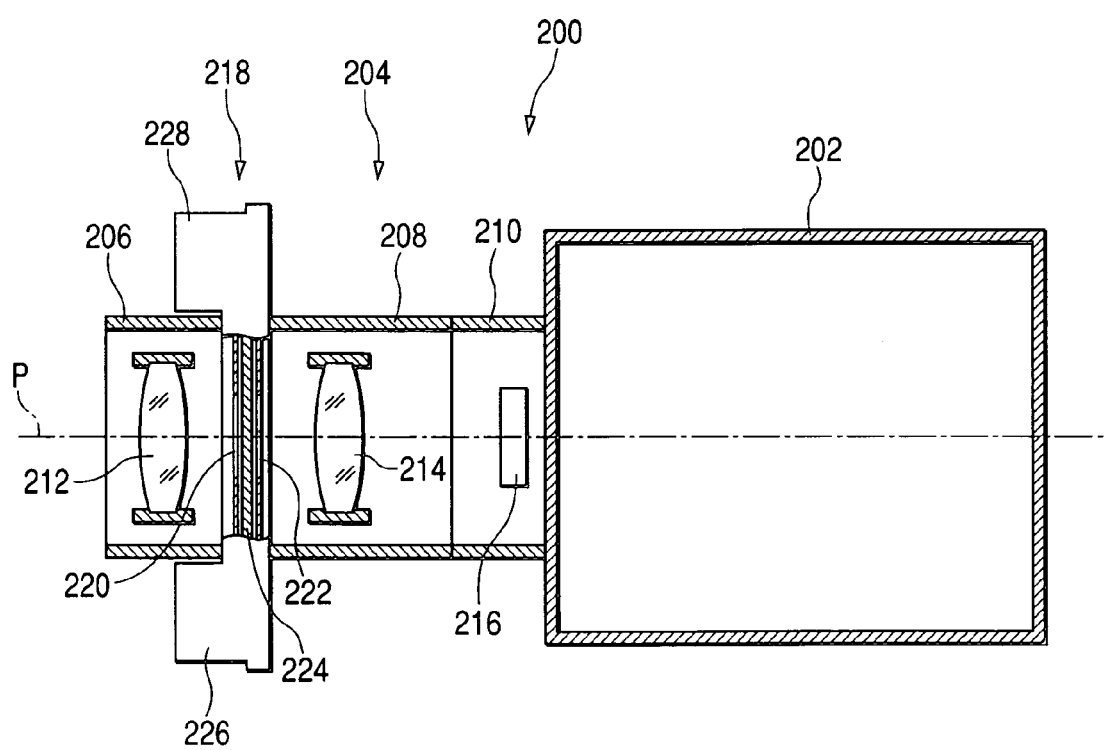
FIG. 3 shows a schematic diagram of a monitoring camera equipped with a lens barrel having an aperture mechanism united integrally with an infrared cutoff filter mechanism.

FIG. 1 is a side elevational view, partly in section, showing the construction of a lens barrel for a monitoring camera according to an exemplary embodiment of the invention. The lens barrel 10 includes: a first fixing cylinder including a front fixing cylinder 12 and a rear fixing cylinder 14; and a second fixing cylinder including a CCD fixing cylinder 16.

An aperture mechanism 40 is disposed between the front and rear fixing cylinders 12 and 14, and the inner peripheral portion of the rear end (the side toward a camera body) of the front fixing cylinder 12 is adhesively bonded to the outer peripheral portion of the front end of the rear fixing cylinder 14.

The rear fixing cylinder 14 and the CCD fixing cylinder 16 are joined together by bayonet connection. The rear fixing cylinder 14 has a male bayonet mount ring 18 formed at its rear end and having bayonet pawls projecting radially outwardly from its outer periphery and spaced from one another along its circumference and bayonet engaging grooves each having one wall defined by one of the bayonet pawls. The CCD fixing cylinder 14 has a female bayonet mount ring 20 attached to its front end and having bayonet protrusions projecting radially inwardly from its inner peripheral surface. After the bayonet protrusions of the female bayonet mount ring 20 are inserted through insertion spaces formed discontinuously between the bayonet pawls of the male bayonet mount ring 18, they are turned relative to each other, whereby the bayonet protrusions of the female bayonet mount ring 20 are engaged in the bayonet engaging grooves of the male bayonet mount ring 18 to join the rear fixing cylinder 14 and the CCD fixing cylinder 16 together.

The CCD fixing cylinder 16 has a plurality of screw holes 22 formed in its rear end portion and is fastened to the body of a monitoring camera not shown by screws not shown, either.

A focus lens (group) 26 held in a lens frame 24 is situated in the front fixing cylinder 12. The lens frame 24 has engaging portions 27 projecting from its peripheral surface and the front fixing cylinder 12 has straight grooves 28 in which the engaging portions 27 are engageable to move the lens frame 24 and the focus lens 26 straight along the optical axis P, as they are guided along the straight grooves 28.

A focus ring 30 is rotatably situated about the outer periphery of the front fixing cylinder 12 and has cam grooves 32 formed in its inner peripheral surface. Cam pins 34 project from the ends of the engaging portions 27 of the lens frame 24 and engage in the cam grooves 32 to cause the crossings between the cam grooves 32 of the focus ring 30 and the straight grooves 28 of the front fixing cylinder 12 to shift along the optical axis P and thereby cause the lens frame 24 and the focus lens 26 to shift along the optical axis P. The rotation of the focus ring 30 makes it possible to control the set position of the focus lens 26 for focus adjustment. The engaging portions 27 are formed at three locations spaced equally apart from one another about the lens frame 24 and accordingly, the straight grooves 28 of the front fixing cylinder 12 and the cam grooves 32 of the focus ring 30 are each three in number.

The focus ring 30 has a handle fixing member 36 attached to its outer periphery. The handle fixing member 36 has a threaded hole 37 extending therethrough from its outer surface to its inner surface and a handle 38 has a threaded portion 39 engaged in the threaded hole 36 and is thereby held by the handle fixing member 36. The operator can rotate the focus ring 30 by using the handle 38 and turning its threaded portion 39 until it contacts the outer peripheral surface of the focus ring 30. By turning the threaded portion 39 of the handle 38 to a further extent to press its end against the outer peripheral surface of the focus ring 30 to a further extent, it is possible to hold the focus ring 30 in its position for desired focus adjustment.

The aperture mechanism 40 disposed between the front and rear fixing cylinders 12 and 14 includes two aperture blades 42 and 44, a holding frame 46 situated behind the aperture blades 42 and 44 for holding them and for mounting and holding the aperture mechanism 40 on the lens barrel 10 (front fixing cylinder 12, rear fixing cylinder 14 and CCD fixing cylinder 16) and a holding plate 48 situated in front of the aperture blades 42 and 44 for holding them. The aperture mechanism 40 is fixed to the front and rear fixing cylinders 12 and 14 by screw not shown.

A holding unit 50 for mounting and holding a driving mechanism for opening and closing the aperture blades 42 and 44 is integrally formed under the holding frame 46 for the aperture mechanism 40 for containing an electrically operated driving machine. The electrically operated driving machine is a driving mechanism for opening and closing the aperture blades 42 and 44 electrically (by an Iris meter). The driving mechanism may alternatively be of the type in which the aperture blades 42 and 44 are opened and closed manually.

A zoom lens (group) 54 held by a lens frame 52 is positioned in the rear fixing cylinder 14. The lens frame 52 has engaging portions 56 projecting from its peripheral surface, while the rear fixing cylinder 14 has straight grooves 58 extending along the optical axis P, and the engaging portions 56 of the lens frame 52 are engageable in the straight grooves 58 of the rear fixing cylinder 14 to move the lens frame 52 and the zoom lens 54 straight along the optical axis P, as they are guided along the straight grooves 58.

A zoom ring 60 is rotatably situated about the outer periphery of the rear fixing cylinder 14 and has cam grooves 62 formed in its inner peripheral surface. The male bayonet mount ring 18 is attached to the rear end of the zoom ring 60 and is engaged with the female bayonet mount ring 20 attached to the front end of the CCD fixing cylinder 16 to join the rear and CCD fixing cylinders 14 and 16 together, as stated before.

Cam pins 63 project from the ends of the engaging portions 56 of the lens frame 52 and engage in the cam grooves 62 of the zoom ring 60. Accordingly, the crossings between the cam grooves 62 of the zoom ring 60 and the straight grooves 58 of the rear fixing cylinder 14 are caused to shift along the optical axis P and the lens frame 52 and the zoom lens 54 are thereby caused to shift along the optical axis P. The rotation of the zoom ring 60 makes it possible to control the set position of the zoom lens 54 for the adjustment of the focal distance (or zoom angle). The engaging portions 56 are formed at three locations spaced equally apart from one another about the lens frame 52 and accordingly, the straight grooves 58 of the rear fixing cylinder 14 and the cam grooves 62 of the zoom ring 60 are each three in number.

The zoom ring 60 has a handle fixing member 64 attached to its outer periphery. The handle fixing member 64 has a threaded hole 65 extending therethrough from its outer surface to its inner surface and a handle 66 has a threaded portion 67 engaged in the threaded hole 65 and is thereby held by the handle fixing member 64. The operator can rotate the zoom ring 60 by using the handle 66 and turning its threaded portion 67 until it contacts the outer peripheral surface of the zoom ring 60. By turning the threaded portion 67 of the handle 66 to a further extent to press its end against the outer peripheral surface of the zoom ring 60 to a further extent, it is possible to hold the zoom ring 60 in its position for desired focal distance adjustment.

The CCD fixing cylinder 16 includes a filter mechanism 70, a correcting glass 72, a cushioning material 74 and a CCD 76 arranged in their order along the optical axis P from the front end of the CCD fixing cylinder 16 to its rear end.

The correcting glass 72 is held in position by a holding portion 78 on the inner peripheral surface of the CCD fixing cylinder 16 and the cushioning material 74. The correcting glass 72 corrects light projected from the zoom lens 54 onto the CCD 76 as by blocking light having a certain wavelength in order to achieve the desired image effect. The material, thickness, etc. of the correcting glass depend on the function and performance of the CCD 76, the desired image effect, etc.

In addition to holding the correcting glass 72 in position, the cushioning material 74 serves as a spacer to make an image forming surface (image focus) 80 coincide with the light receiving surface 82 of the CCD 76 (hereinafter referred to as the imaging surface).

The CCD 76 is attached to the center of a CCD base 84 on the front side of the CCD base 84. The CCD 76 transforms an optical image formed on the imaging surface 82 into an electrical signal. The electrical signal is sent to the monitoring camera body through a cable connected to the CCD base 84, but not shown.

The filter mechanism 70 situated behind the zoom lens 54 is so formed as to extend through the CCD fixing cylinder 16 and is fixed to the CCD fixing cylinder 16 by screws not shown.

The filter mechanism 70 has a filter fixing plate 86 to which optical filters including an infrared cutoff filter 95 blocking infrared rays (e.g., light in a near-infrared region) and a clear filter 97 passing infrared rays are attached, a holding frame 88 for holding the filter fixing plate 86 and for mounting and holding the filter mechanism 70 on the lens barrel 10 (front fixing cylinder 12, rear fixing cylinder 14 and CCD fixing cylinder 16) and a holding portion 90 mounting and holding an electrically operated driving machine for moving the filter fixing plate 86 vertically to change the filters on the optical axis P.

The invention is, however, not limited to the filter mechanism 70 having the filters changed on the optical axis P by means of an electrically operated driving machine. It is alternatively possible to employ, for example, an operating member for manually moving the filter fixing plate 86 vertically.

FIGS. 2A and 2B each are a front elevational view of the filter mechanism 70 shown in FIG. 1. FIG. 2A shows the state in which the infrared cutoff filter 95 is positioned on the optical axis P, and FIG. 2B shows the state in which the clear filter 97 is positioned on the optical axis P.

The filter fixing plate 86 is a substantially rectangular thin metal plate having a longitudinally extending arm 92 formed at one end, as shown in FIG. 2A. The arm 92 has a link hole 98 formed at its distal end.

The filter fixing plate 86 has substantially square openings 94 and 96 formed one after the other along its length. The opening 94 is covered with the infrared cutoff filter 95 and the opening 96 is covered with the clear filter 97. The infrared cutoff and clear filters 95 and 97 are larger than the openings 94 and 96, respectively, and have their edges fixed to the filter fixing plate 86 by an adhesive, etc.

The clear filter 97 corrects any deviation of the image focus location when the infrared cutoff filter 95 is set aside from the optical axis P. Accordingly, the clear filter 97 is so designed in thickness, material, etc. that the image focus location when the clear filter 97 is positioned on the optical axis P may coincide with the image focus location when the infrared cutoff filter 95 is positioned on the optical axis P.

The holding frame 88 has two lugs 100 formed on its opposite longitudinal edges, respectively, for securing the filter mechanism 70 to the CCD fixing cylinder 16. Each lug 100 has a hole 102 formed at its center for passing a screw therethrough. The holes 102 are aligned with holes formed in the CCD fixing cylinder 16, but not shown, and screws not shown are threadedly engaged therethrough for securing the filter mechanism 70 to the CCD fixing cylinder 16.

The holding frame 88 has a circular opening 104 formed substantially at its center for passing incident light. The opening 104 has its center aligned with the optical axis P when the filter mechanism 70 is secured to the CCD fixing cylinder 16.

The filter fixing plate 86 is laid on the surface of the holding frame 88. The filter fixing plate 86 is held against separation from the holding frame 88 by e.g. protrusions extending from the edges of the holding frame 88 to its inside, but not shown, and is slidable along its length.

The holding frame 88 has a substantially circular connecting portion 106 formed toward its lower end. The connecting portion 106 includes a rotary shaft 108 of the electrically operated driving machine (but not shown) mounted in the holding portion 90, a rotary arm 110 attached to the rotary shaft 108 and a link member 112 connecting one end of the rotary arm 110 with the link hole 98 of the arm 92.

The rotary shaft 108, the rotary arm 110, the link member 112, the link hole 98, the arm 92, and the filter fixing plate 86 perform a function of a filter switch portion for installing and uninstalling (or changing) optical filters on the optical axis P. When the electrically operated driving machine is driven, the rotary shaft 108 is rotated and the rotary arm 110 is rotated within a specific angular range about the rotary shaft 108. With the rotation of the rotary arm 110, the link member 112 at one end thereof moves along the circumference of the connecting portion 106 and thereby causes the filter fixing plate 86 having the arm 93 connected by the link member 112 to slide longitudinally.

When the rotary arm 110 stays at one of the limits of rotation as shown in FIG. 2A, the infrared cutoff filter 95 is aligned with the opening 104. When the rotary arm 110 stays at the other limit of rotation as shown in FIG. 2B, the clear filter 97 is aligned with the opening 104.

When the monitoring camera to which the lens barrel 10 as described is mounted is used in the visible region, the electrically operated driving machine is driven to position the infrared cutoff filter 95 on the optical axis P. When it is, on the other hand, used in the infrared region, the electrically operated driving machine is driven to position the clear filter 97 on the optical axis P. There is no deviation in focus between when an image is taken in the visible region and when an image is taken in the infrared region, since the image focus location when the infrared cutoff filter 95 is positioned on the optical axis coincides with the image focus location when the clear filter 97 is positioned, as stated before. Therefore, there is no need for focus adjustment every time image taking is switched between the visible region and the infrared region.

The infrared cutoff and clear filters 95 and 97 in the filter mechanism 70 do not have any effect on the distance between the focus lens 26 held in the first fixing cylinder 12 and the zoom lens 54 held in the second fixing cylinder 14, since those filters are installed in the CCD fixing cylinder 16 situated to rearward of the second fixing cylinder 14. The holding portion 90 of the filter mechanism 70 is formed around the CCD fixing cylinder 16 and does not affect any component part situated around the first or second fixing cylinder 12 or 14. Therefore, the lens barrel according to the invention shares many parts with any ordinary lens barrel and can, therefore, be manufactured at a low cost.

As the filter mechanism 70 is installed separately from the aperture mechanism 40, they are easy to maintain, since in the event of failure of any component part of one of those mechanisms, it is sufficient to disassemble the mechanism in question, examine the cause of the failure and repair it.

While the lens barrel of the invention has been described in detail, it is needless to say that this invention is not limited to the example as described above, but that improvements or variations may be made without departing from the gist of this invention.

The entire disclosure of each and every foreign patent application from which the benefit of foreign priority has been claimed in the present application is incorporated herein by reference, as if fully set forth herein.

What is claimed is:

1. A lens barrel capable of being mounted to a camera body, which comprises:
   an aperture between two lenses held in the lens barrel;
   at least one optical filter disposed to rearward of one of the two lenses, wherein the one of the two lenses is situated closer to the camera body than the other of the two lenses, and the at least one optical filter blocks or transmits light depending on a wavelength of the light;
   a filter switching unit to removably position the at least one optical filter on an optical axis of the lens barrel using a linear motion;
   a first fixing cylinder holding the two lenses; and
   a second fixing cylinder disposed to rearward of the first fixing cylinder, the second fixing cylinder holding an imaging device, wherein the at least one optical filter is disposed in the second fixing cylinder.

2. The lens barrel according to claim 1, wherein the at least one optical filter blocks light in a near-infrared region.

3. The lens barrel according to claim 1, wherein the at least one optical filter comprises:
   a first optical filter blocking light in an near-infrared region; and
   a second optical filter transmitting light in the near-infrared region.

4. The apparatus of claim 1, wherein the at least one optical filter comprises:
   a plurality of filters, the plurality of filters being attached to a filter fixing plate.

5. The apparatus of claim 4, wherein the filter fixing plate is linearly moveable, the linear motion being driven by a rotary mechanism.

6. The apparatus of claim 1, wherein the second fixing cylinder is
   —a CCD fixing cylinder located rearward of the lens barrel, the at least one filter and the filter switch unit being attached to the CCD fixing cylinder.

7. The apparatus of claim 1, wherein the linear motion is driven by a rotary mechanism.

8. The apparatus of claim 1, wherein, at any moment, only one of the at least one optical filters is positionable along the optical axis.

9. The lens barrel according to claim 1, wherein the at least one optical filter is disposed between the first fixing cylinder and the second fixing cylinder.

10. The lens barrel according to claim 9, wherein the first fixing cylinder comprises a front fixing cylinder and a rear fixing cylinder, the aperture being disposed between the front and rear fixing cylinder.

* * * * *